US012596288B2

(12) United States Patent
Komljenovic et al.

(10) Patent No.: US 12,596,288 B2
(45) Date of Patent: Apr. 7, 2026

(54) TEMPERATURE STABILIZED DIELECTRIC BASED ON-CHIP INTERFEROMETERS

(71) Applicants:Tin Komljenovic, Goleta, CA (US); Ali Eshaghian Dorche, Goleta, CA (US); Minh Tran, Goleta, CA (US)

(72) Inventors: Tin Komljenovic, Goleta, CA (US); Ali Eshaghian Dorche, Goleta, CA (US); Minh Tran, Goleta, CA (US)

(73) Assignee: Nexus Photonics, Inc, Goleta, CA (US)

( * ) Notice: Subject to any disclaimer, the term of this patent is extended or adjusted under 35 U.S.C. 154(b) by 335 days.

(21) Appl. No.: 18/241,193

(22) Filed: Aug. 31, 2023

(65) Prior Publication Data

US 2025/0076727 A1     Mar. 6, 2025

(51) Int. Cl.
*G02F 1/225* (2006.01)
*G02F 1/21* (2006.01)
(52) U.S. Cl.
CPC ............ *G02F 1/2257* (2013.01); *G02F 1/212* (2021.01); *G02F 2201/06* (2013.01); *G02F 2203/05* (2013.01); *G02F 2203/21* (2013.01)
(58) Field of Classification Search
CPC .... G02F 1/2257; G02F 1/212; G02F 2201/06; G02F 2203/05; G02F 2203/21
See application file for complete search history.

(56) References Cited

U.S. PATENT DOCUMENTS

| | | | | |
|---|---|---|---|---|
| 6,122,416 A | * | 9/2000 | Ooba | G02F 1/3132 398/1 |
| 6,310,999 B1 | * | 10/2001 | Marcuse | G02F 1/065 385/16 |
| 6,393,185 B1 | * | 5/2002 | Deacon | G02B 6/42 385/12 |

(Continued)

OTHER PUBLICATIONS

Guha et al., Minimizing temperature sensitivity of silicon Mach-Zehnder interferometers, Opt. Express 18, 1879-1887 (2010) (Year: 2010).*

(Continued)

*Primary Examiner* — Peter Radkowski
(74) *Attorney, Agent, or Firm* — Shalini Ventatesh

(57)     ABSTRACT

A device has a dual-geometry waveguide structure with an input, an output and two coupler structures optically coupled using arms of different optical path lengths. Each arm has a first passive waveguide having a first length and a dual-core waveguide geometry, coupled by a transition structure to a second passive waveguide having a second length and a single-core waveguide geometry. Optical mode confinement is larger in the first passive waveguide than in the second passive waveguide. The first and second lengths are selected such that a temperature sensitivity of optical path length difference of the dual-geometry waveguide structure is lower than a temperature sensitivity of optical path length difference that would characterize a standard waveguide structure differing from the dual-geometry waveguide structure in that no transition structure is present within either (Continued)

arm of the standard waveguide structure, each arm of the standard waveguide structure either excluding any waveguide having a dual-core waveguide geometry or excluding any waveguide having a single-core waveguide geometry.

10 Claims, 7 Drawing Sheets

(56)                    References Cited

U.S. PATENT DOCUMENTS

| 6,535,672 | B1 * | 3/2003 | Paiam | G02B 6/2813 |
| | | | | 385/39 |
| 6,643,419 | B2 * | 11/2003 | Chang | G02B 6/1228 |
| | | | | 385/132 |
| 6,751,396 | B2 * | 6/2004 | Erben | G02B 6/10 |
| | | | | 385/141 |
| 6,925,232 | B2 * | 8/2005 | Laskowski | G02F 1/025 |
| | | | | 385/39 |
| 6,987,895 | B2 * | 1/2006 | Johannessen | G02B 6/12007 |
| | | | | 385/27 |
| 7,469,084 | B2 * | 12/2008 | Aalto | G02B 6/125 |
| | | | | 385/28 |
| 8,676,009 | B2 * | 3/2014 | Weimann | G02B 6/12 |
| | | | | 385/48 |
| 10,746,922 | B2 * | 8/2020 | Davies | H01S 5/026 |
| 11,635,570 | B1 * | 4/2023 | Thompson | G02B 6/1228 |
| | | | | 385/28 |
| 11,927,801 | B2 * | 3/2024 | Bian | G02B 6/126 |

| 2003/0103710 | A1 * | 6/2003 | Chang | G02B 6/1228 |
| | | | | 385/8 |
| 2003/0123806 | A1 * | 7/2003 | Erben | G02B 6/10 |
| | | | | 385/40 |
| 2004/0240818 | A1 * | 12/2004 | Laskowski | G02F 1/011 |
| | | | | 385/16 |
| 2007/0286552 | A1 * | 12/2007 | Aalto | G02B 6/125 |
| | | | | 385/50 |
| 2012/0237153 | A1 * | 9/2012 | Weimann | G02B 6/122 |
| | | | | 29/829 |
| 2019/0369328 | A1 * | 12/2019 | Davies | H01S 5/026 |

OTHER PUBLICATIONS

Katzman et al., Robust Directional Couplers for State Manipulation in Silicon Photonic-Integrated Circuits, J. Lightwave Technol. 40, 7634-7639 (2022) (Year: 2022).*
Korai et al., Design of an Athermal Interferometer Based on Tailored Subwavelength Metamaterials for On-Chip Microspectrometry, in IEEE Photonics Journal, vol. 11, No. 6, pp. 1-11, Dec. 2019, Art No. 4601611, doi: 10.1109/JPHOT.2019.2943774. (Year: 2019).*
Lu et al., Low temperature sensitivity on-chip Fourier-transform spectrometer based on dual-layer Si3N4 spiral waveguides, Photon. Res. 11, 591-599 (2023) (Year: 2013).*
Sharma et al., Coupled mode theory and coupled mode photonic devices: A Review, Asian Journal of Physics, vol. 30, No. 5 (2021), Available on: www.asianjournalofphysics.in (Year: 2021).*
Tao et al. Athermal 4-channel (De-)multiplexer in silicon nitride fabricated at low temperature. 2018. Photonics Research. 6. 686. 10.1364/PRJ.6.000686. (Year: 2018).*

* cited by examiner

| ~10% confinement | | |
|---|---|---|
| n1 @25C | | 1.496 |
| dn1/dT | | 1.24E-05 |
| Calculated dL [um] | | 396.095 |
| Calculated OPLD [um] @25C | | 592.5581 |
| ~75% confinement | | |
| n2 @25C | | 1.86 |
| dn2/dT | | 2.15E-05 |
| Calculated dL [um] | | 318.5796 |
| Calculated OPLD [um] @25C | | 592.5581 |
| Compensated | | |
| n1 @25C | | 1.496 |
| dn1/dT | | 1.24E-05 |
| n2 @25C | | 1.86 |
| dn2/dT | | 2.15E-05 |
| Arm 1 Length 1 (um) | | 100 |
| Arm 1 Length 2 (um) | | 910 |
| Arm 2 Length 1 (um) | | 1500 |
| Arm 2 Length 2 (um) | | 102.5581 |
| Calculated OPLD [um] @25C | | 592.5581 |

520

500

TEMPERATURE STABILIZED DIELECTRIC BASED ON-CHIP INTERFEROMETERS

FIELD OF THE INVENTION

The present invention relates to photonic integrated circuits. More specifically, certain embodiments of the invention relate to improved temperature stability of dielectric based interferometers that can be heterogeneously integrated with active components using dissimilar materials that are optically coupled.

BACKGROUND OF THE INVENTION

A photonic integrated circuit (PIC) or integrated optical circuit is a device that integrates multiple photonic functions and as such is analogous to an electronic integrated circuit. The major difference between the two is that a photonic integrated circuit provides functions for information signals imposed on optical carrier waves.

Various optical functionalities can be implemented in a PIC, depending on the application. In some cases, on-chip interferometers can be beneficial to be implemented. Interferometers can be utilized to perform precise measurements (wavelength, distance, frequency noise, etc), spectroscopy, filtering, etc. Common designs to implement an on-chip interferometer are using Mach-Zehnder, or Michelson configurations, but others can also be implemented.

PIC-based interferometers have been demonstrated using various material systems such as e.g., indium-phosphide (InP), silicon (Si), silicon-nitride (SiN), and others commonly used to realize a PIC. They typically exhibit temperature sensitivity related to the change of the refractive index with temperature (dn/dT) which is a material dependent quantity. Si has a relatively large dn/dT ($\sim$1.84e-4), while SiN has a significantly smaller but still not negligible dn/dT ($\sim$2.5e-5). The use of various claddings to compensate the waveguide core material dn/dT has been explored, with some demonstrations using polymers or titanium-dioxide ($TiO_2$) to largely compensate for first order thermo-optical effects. But such approaches can be challenging to use in some PICS and in fabricating them at scale, especially depending on the choice of materials, wavelength of operation, power handling and additional needed functionality (e.g. integrating active components such as photodetectors, amplifiers and/or optical sources).

In some applications it would be beneficial to realize a PIC-based interferometer with all the following characteristics: (1) improved thermal stability, (2) wide-band optical transparency, (3) high-power handling and (4) on-chip active components (e.g. photodetectors, amplifiers, modulators and optical sources).

Interferometers that utilize dielectric or high-bandgap materials for waveguides can address some of these needs, namely wide-band optical transparency, and high-power handling (needs #2 and #3 noted above). Examples of such materials are SiN, silicon-oxynitride (SiON), $TiO_2$, tantalum-pentoxide ($Ta_2O_5$), aluminum-oxide ($Al_2O_3$), aluminum-nitride (AlN) and others. Still, they cannot provide improved thermal stability (beyond the restriction of the material's dn/dT) and do not support on-chip active components.

A recent approach to integrate on-chip active components (need #4) was presented in U.S. Pat. No. 10,859,764 B2 employing butt-coupling in combination with a mode-converter to allow the heterogenous process to be used and efficiently couple passive waveguides to active components.

The present invention is directed to addressing requirement #1, improved thermal stability, while preserving all other characteristics (2-4) allowing for PICs with interferometers that can be fabricated using CMOS-like processes. In particular, embodiments described below are concerned with the detailed design of a photonic platform that allows for the creation of high-performance thermally stabilized interferometers.

DETAILED DESCRIPTION

Figure 1:
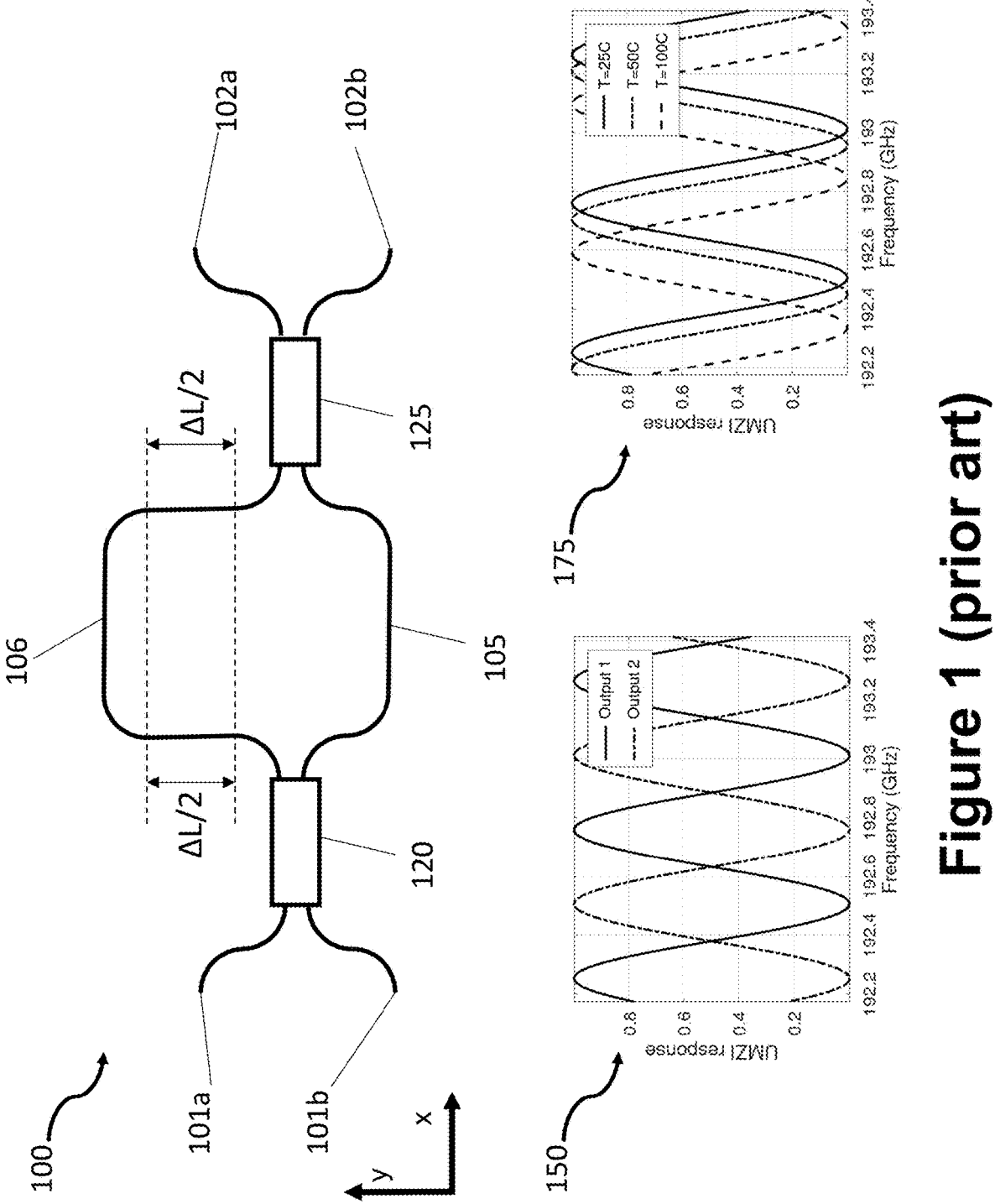
FIG. 1 (prior art) illustrates a top-down view of an on-chip interferometer in Mach-Zehnder configuration and two views of illustrative responses of that interferometer.

Described herein are embodiments of a platform for realization of photonic integrated circuits comprising interferometers with improved temperature stability that can be heterogeneously integrated with active components In the following detailed description, reference is made to the accompanying drawings which form a part hereof, wherein like numerals designate like parts throughout, and in which are shown by way of illustration embodiments in which the subject matter of the present disclosure may be practiced. It is to be understood that other embodiments may be utilized, and structural or logical changes may be made without departing from the scope of the present disclosure. Therefore, the following detailed description is not to be taken in a limiting sense, and the scope of embodiments is defined by the appended claims and their equivalents.

The description may use perspective-based descriptions such as top/bottom, in/out, over/under, and the like. Such descriptions are merely used to facilitate the discussion and are not intended to restrict the application of embodiments described herein to any particular orientation. The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The term "coupled with," along with its derivatives, may be used herein. "Coupled" may mean one or more of the following. "Coupled" may mean that two or more elements are in direct physical, electrical, or optical contact. However, "coupled" may also mean that two or more elements indirectly contact each other, but yet still cooperate or interact with each other, and may mean that one or more other elements are coupled or connected between the elements that are said to be coupled with each other. The term "directly coupled" means that two or more elements are in direct contact in at least part of their surfaces. The term "butt-coupled" is used herein in its normal sense of meaning an "end-on" or axial coupling, where there is minimal or zero axial offset between the elements in question. The axial offset may be, for example, slightly greater than zero in cases where a thin intervening layer of some sort is formed between the elements, such as thin coating layer typically used to provide high-reflectivity or anti-reflectivity functionality. It should be noted that the axes of two waveguide structures or elements need not be colinear for them to be accurately described as being butt-coupled. In other words, the interface between the elements need not be perpendicular to either axis in the case of e.g. angled interface. Angled interfaces can be used, as an example, to control the back reflection. No adiabatic transformation occurs between butt-coupled structures.

Term "active device," "active structure" or otherwise "active" element, part, component may be used herein. A device or a part of a device called active is capable of light generation, amplification, modulation and/or detection using electrical contacts. This is in contrast to what we mean by a "passive device" whose principal function is to confine and guide light, and/or provide splitting, combining, filtering and/or other functionalities that are commonly associated with passive devices. Some passive devices can provide functions overlapping with active device functionality, such as phase tuning implemented using thermal effects or similar that can provide modulation. No absolute distinction should be assumed between "active" and "passive" based purely on material composition or device structure. A silicon device, for example, may be considered active under certain conditions of modulation, or detection of low wavelength radiation, but passive in most other situations.

FIG. 1 (prior art) depicts a top-down view 100 of a PIC-based Mach-Zehnder interferometer (UMZI). In the illustrative embodiment, the UMZI comprises two input ports 101a and 101b, and two output ports 102a and 102b. An optical signal can be incident at either of the input ports 101a/101b before arriving at coupler 120 providing splitting or combining functionality. Coupler 120 can be realized in multiple ways as is common with the art of PICs such as a directional coupler, multi-mode interference (MMI) coupler, adiabatic coupler or any other structure that can split an incident signal into at least two parts that are efficiently coupled to two waveguide arms 105 and 106. Each of the two arms is characterized by a corresponding optical path length (OPL) where the OPL is simply the distance the light travels times the refractive index of the mode in which light propagates. For two arms that have a length difference ($\Delta L$) as sketched in FIG. 1 and/or different effective refractive indices (not shown), we can determine the OPL difference (OPLD) that will define the periodicity or the free spectral range (FSR) of the UMZI response. $\Delta L$ can be very precisely controlled in a PIC, so a wide range of FSRs can be realized. In the remainder of this disclosure, the term "effective refractive index" is sometimes shortened to refractive index for simplicity. Once the two beams (the two parts of the input signal) propagate through the two arms, they are coherently combined in a second coupler 125 and routed to output ports 102a and 102b. The intensity of the light at each of the arms 102a and 102b is a function of the intensity of each of the incident beams and the phase relationship between them at the second coupler, where the phase relationship is a function of the wavelength (or equivalently of frequency) and also the OPLD. In this way an UMZI will exhibit a frequency selective response that can be used to filter, measure, and/or modulate the incident light. An illustrative response of the two-port UMZI is shown in view 150 where the two outputs are approximately 180 degrees out of phase as is common for 2×2 designs that use directional couplers and/or MMI couplers. Many variations have been designed, using e.g., 3×3, 2×4 or other splitting ratios which can also change the phase relationships between the output arms as is known in the art. In all cases, the response of the UMZI has temperature dependence, as the refractive index has temperature dependence, and thus a change in temperature will change the OPLD between the arms. An illustrative effect of the temperature change on the response on one of the arms of the UMZI is shown in view 175, where both the free-spectral range and the phase (response) are changed by temperature.

Figure 2:
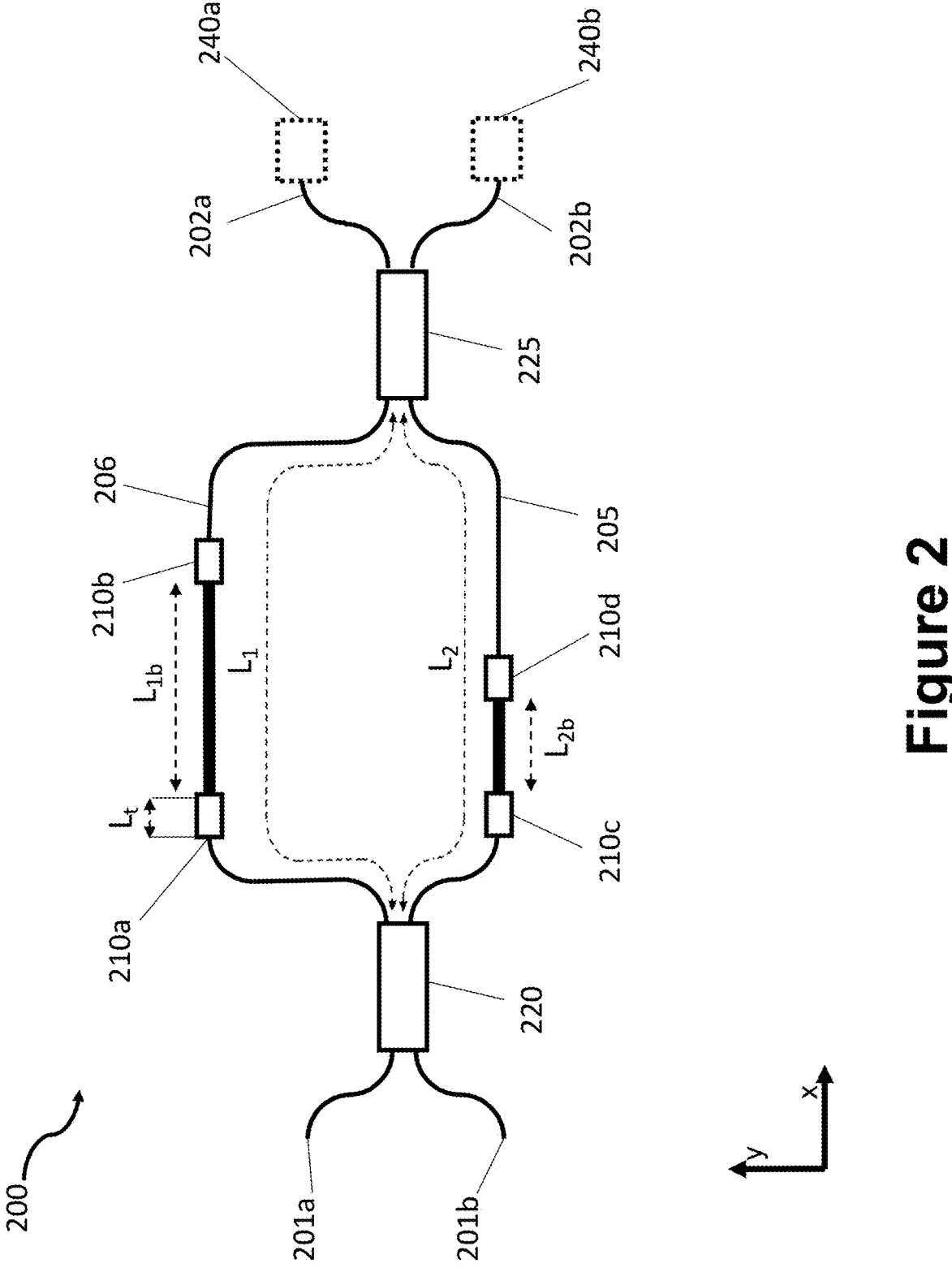
FIG. 2 illustrates a top-down view of an on-chip interferometer in Mach-Zehnder configuration according to some embodiments of the present invention.

FIG. 2 depicts a top-down view 200 of a PIC-based UMZI corresponding to one embodiment of present invention. In the illustrative embodiment, the UMZI comprises two input ports 201a and 201b, and two output ports 202a and 202b. Output ports can, in some embodiments, be efficiently optically coupled to photodetectors 240a and 240b as will be described in more detail with the help of FIG. 7. An optical signal can be incident at either of the input ports 201a/201b before arriving at coupler 220. Coupler 220 can be realized in multiple ways as is common with the art of PICs such as a directional coupler, multi-mode interference (MMI) coupler, adiabatic coupler or any other structure that can split incident signal into at least two parts that are efficiently coupled to two waveguide arms 205 and 206. The total physical length of arm 206 is equal to $L_1$, and the total physical length of arm 205 is equal to $L_2$. Each of the arms comprises three distinct segments: a first passive waveguide having a first waveguide geometry, a second passive waveguide having a second waveguide geometry and at least one transition structure between the two waveguides. In the shown embodiment, each arm includes two such transition structures bounding the ends of one of the two passive waveguides (indicated by a relatively thick line), sandwiched between two portions of the other passive waveguide. The two waveguide geometries are described in more detail with the help of FIG. 3. They are characterized by different confinement factors, which may be referred to as "confinements" for simplicity, of the optical mode in the core, and correspondingly with different effective refractive indices and different dn/dT as will be also described with the help of FIG. 3. The terms confinement factor and confinement are used herein with their generally accepted meaning in waveguide optics, as the ratio of the optical power within the core region of a waveguide structure to the total guided optical power within the entire waveguide structure.

Transition structures (210a and 210b for arm 206, and 210c and 210d for arm 205) serve to efficiently transfer the optical mode between the two waveguide geometries as will be described in more detail with the help of FIG. 4. The transition structures are characterized by length $L_t$. In some embodiments, the transition structures utilize one or more tapered structures. Each arm OPL is now defined by the lengths and effective refractive indices of all segments of that arm, where the OPLD between the arms will define the FSR. Both arms have an identical number of transition structures, so the transition structures balance out between the arms at all temperatures in terms of change of the OPL, while each arm has different length of the waveguides realized in the first passive waveguide geometry and the second passive waveguide geometry. The second waveguide geometry physical length, in FIG. 2, is marked with $L_{1b}$ and $L_{2b}$ for first and second arm respectively. In the first arm, the physical length of the first waveguide, for the shown case with two transition structures, is given by $L_{1a}=L_1-L_{1b}-2*L_t$. In other cases where there is a different number of transition structures, the factor multiplying $L_t$ is adjusted accordingly. Similarly, the physical length of the first waveguide in the second arm, for the shown case with two transition structures, is given by $L_{2a}=L_2-L_{2b}-2*L_t$. For simplicity, $L_{1a}$ and $L_{2a}$ are not labeled in FIG. 2, but it will be appreciated that, in the embodiment shown in FIG. 2, each is made up of two sub-segments, those of $L_{1a}$ "sandwiching" $L_{1b}$ and those of $L_{2a}$ sandwiching $L_{2b}$. In other embodiments (not shown), $L_{1a}$ and $L_{1b}$ can be made up of a single segment (with only one transition element in the arm), or more than two segments (if more than two transition elements are present in each arm). The combined physical lengths of all such segments realized in first waveguide geometry in each arm correspond to $L_{1a}$ and $L_{2a}$. Similarly, the combined physical lengths of all such segments realized in second waveguide geometry in each arm correspond to $L_{1b}$ and $L_{2b}$.

Thermal instability would manifest itself as changes in the intensity of the light at each of the arms 202a and 202b at a given wavelength, as a function of the temperature of the UMZI. The goal of the present invention, to improve the thermal stability of the UMZI, is achieved by selecting the lengths of each of the $L_{1a}$, $L_{1b}$, $L_{2a}$ and $L_{2b}$ to provide the OPLD needed for the desired FSR, such that that FSR will have improved stability in the expected operating temperature range. In the ideal case, the optimization can be such that there is zero temperature sensitivity, but in a real case there may be some residual temperature sensitivity, though it is generally significantly smaller compared to the prior art case of FIG. 1. As noted above, embodiments of the present invention are directed towards minimizing temperature sensitivity of the UMZI.

Figure 3:
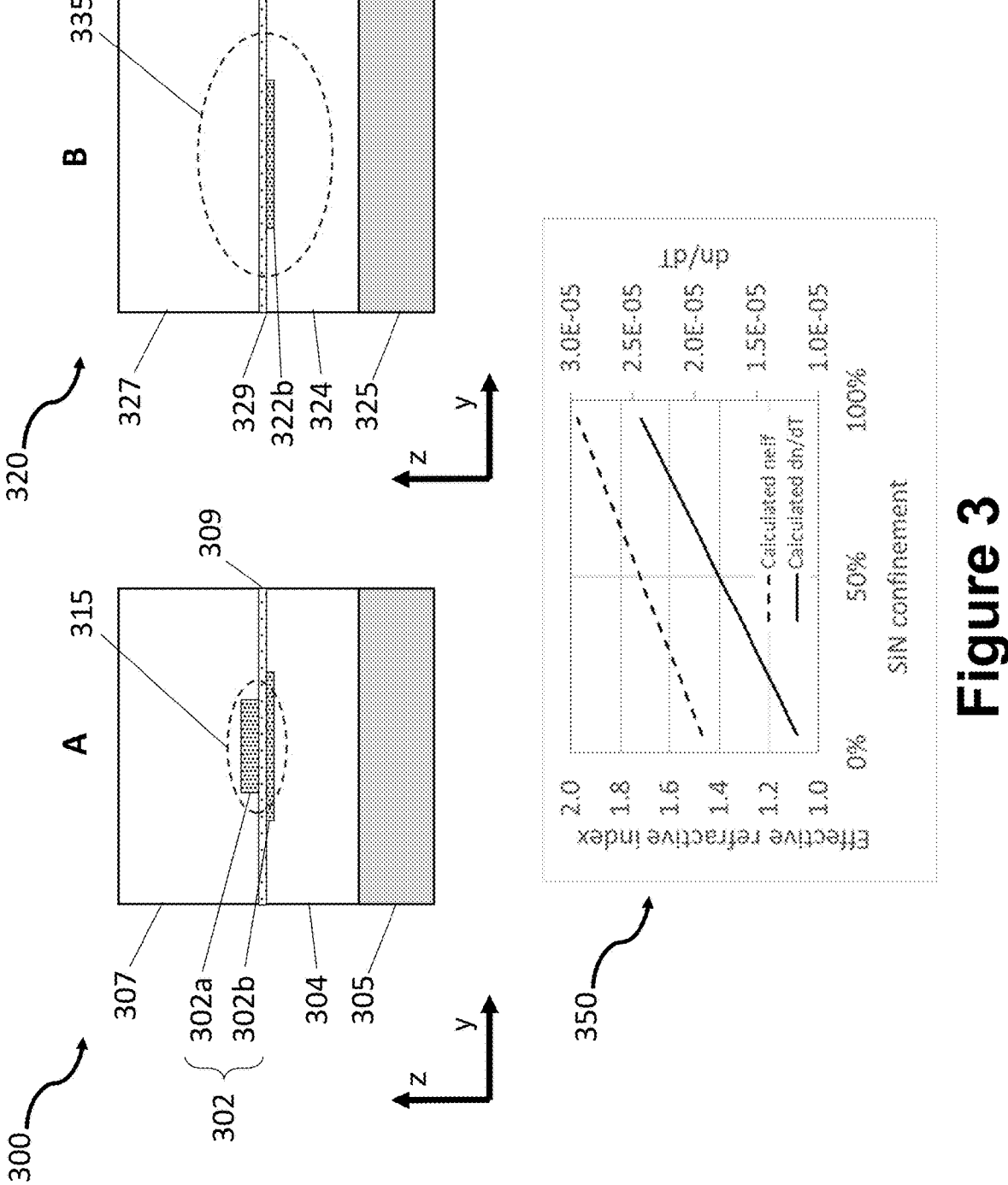
FIG. 3 shows two end-on cross-sectional views of a device according to some embodiments of the present invention, and some corresponding numerical calculations.

FIG. 3 shows a cross-sectional view 300 corresponding to a region in which the first waveguide geometry characterizing the first passive waveguide shown in FIG. 2 is realized using a dual-core waveguide comprising layers 302a and 302b. In this particular embodiment, the two waveguide cores comprise SiN, but other dielectric materials such as, but not limited to, SiON, $TiO_2$, $Ta_2O_5$, $Al_2O_3$, and AlN can be used. A thin spacer layer 309 is present between the cores to improve the fabrication control, as will be described with the help of view 320. In some embodiments, the spacer layer is one of $SiO_2$, $Al_2O_3$ and SiON, but other materials can also be used. In all embodiments, the material for spacer layer is different than the material used for cores of the waveguide. The optical mode 315 is guided by the combination of the two core regions (302a and 302b), with layers 304 and 307 providing cladding functionality. This is referred to as a dual-core waveguide geometry. The most common material for the cladding is $SiO_2$, but others such as SiON, polymers, etc. can be used. The refractive index of each cladding layer (304 and 307) is smaller than the refractive index of each of the core regions 302a and 302b. Layer 305 is a substrate, such as Si, InP, gallium-arsenide (GaAs), quartz, sapphire, glass, gallium-nitride (GaN), silicon-on-insulator (SOI) or any other material suitable for semiconductor and dielectric processing as a substrate, as is known in the art.

Cross-sectional view 320 corresponds to a region in which the second waveguide geometry characterizing the second passive waveguide shown in FIG. 2 is realized, using a single-core waveguide comprising layer 322b. Functional layers 324 to 329 (unless explicitly defined differently) correspond to functional layers 304 to 309 as described in relation to view 300. The difference is that in view 320 there is no layer corresponding to layer 302a which is present in view 300, and layer 322b, which may be seen as corresponding to layer 302b, provides the single core region for the waveguide. In some embodiments, this is done by etching away layer 302a using spacer layer 309/329, with proper selection of materials and etching technique/chemistry, to provide improved process control by providing improved etch selectivity. The optical mode 335 is guided by the resulting single core region and is characterized by lower confinement in the core material, compared to that characterizing mode 315. A transition between the two regions shown in views 310 and 320 can utilize tapers in at least one of the layers 302a and 302b as will be described with the help of FIG. 4.

In some embodiments the thickness of layer 302b and 322b is between 50 nm and 200 nm. In some embodiments, the thickness of layer 302a is between 50 nm and 650 nm.

View 350 shows an illustrative calculation of the effective refractive index and dn/dT coefficient as the confinement in core and cladding is linearly changed between 5% and 95%. In this particular case, the core is SiN and cladding is $SiO_2$, but other material combinations can also be used, and it is straightforward to reproduce calculations for any such case. The key result of this calculation is to show that the dn/dT can be varied between the two passive waveguide geometries with control of the confinement, and as described above, and that the dual-core geometry with spacer facilitates more robust control of the confinement due to more precise etch stop. The thickness of core 322b, where the spacer layer is present, is not changed if the etch used to remove the sublayer corresponding to 302a in view 300 stops anywhere inside the spacer layer (allowing for additional process tolerance), while if the spacer layer were not present, slight variations of the etch needed to generate a similar waveguide geometry would have a larger effect on the dn/dT of this cross-section and would result in increased temperature sensitivity of the UMZI due to fabrication variations.

It should be noted that the order of first and second waveguide geometries, meaning which one is encountered first by light passing through, can be flipped while providing identical temperature compensation. E.g., the first waveguide geometry can be designed to provide lower confinement in the waveguide core, and the second waveguide geometry can be designed to provide higher confinement in the waveguide core.

Figure 4:
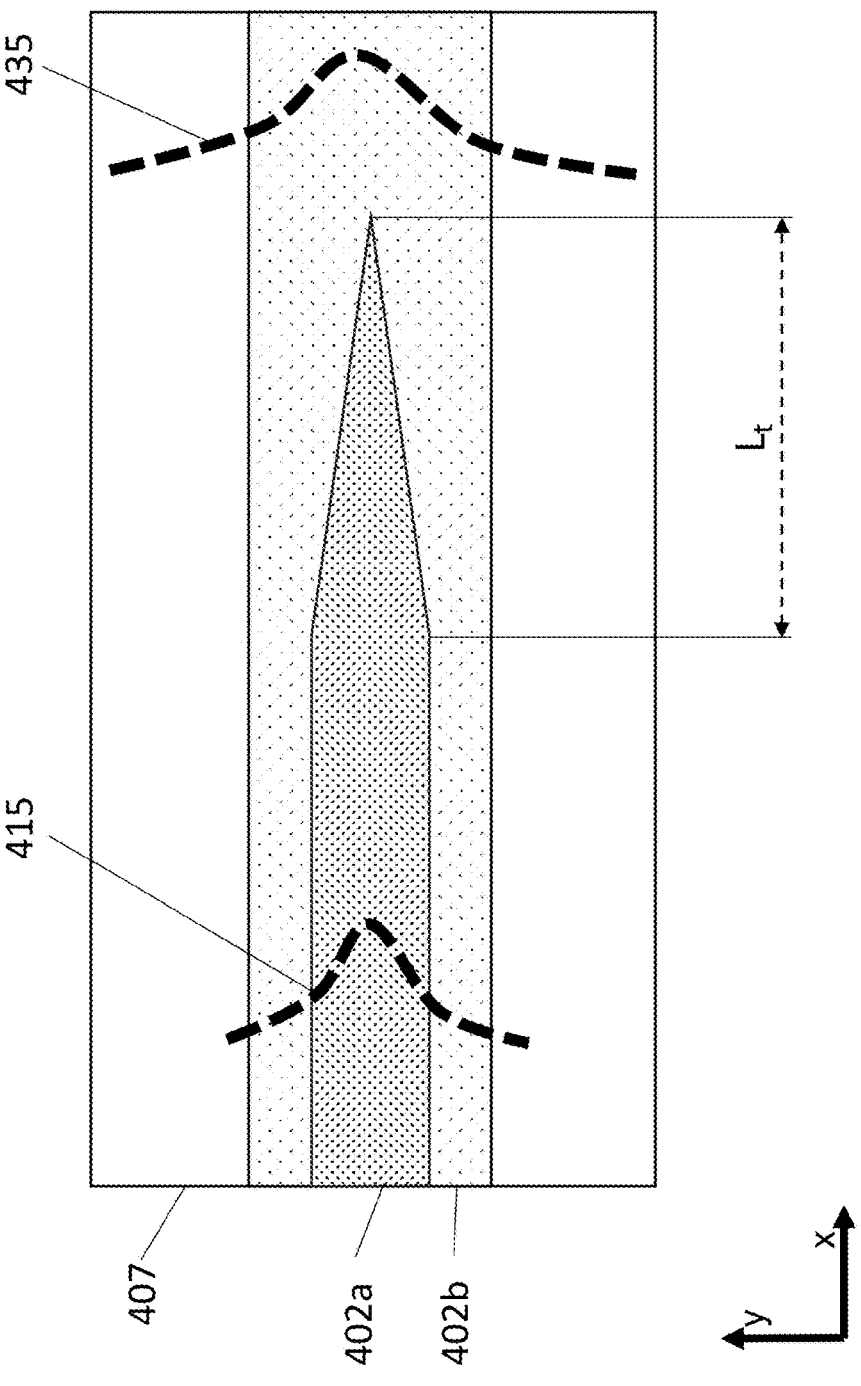
FIG. 4 shows a cross-sectional top-down view of a transition region of a device according to some embodiments of the present invention.

FIG. 4 shows a cross-sectional top-down view of a transition region of a device according to some embodiments of the present invention. The optical mode 415, corresponding to the optical mode 315 as described with the help of FIG. 3 and view 300, is transformed into optical mode 435, corresponding to the optical mode 335 as described with the help of FIG. 3 and view 320, by using a transition structure realized as a taper structure in layer 402a (corresponding to layer 302a in view 300) that terminates at a tip. The taper length $L_t$ corresponds to the $L_t$ as described with the relation to FIG. 2. In this way a low-loss transition between modes 415 and 435 can be engineered. In other embodiments (not shown), a transition structure can utilize tapers in layer 402b and layer 402a can be abruptly terminated (without gradually reducing the y-axis width). In yet other embodiments (not shown), a transition structure can utilize tapers in both layers 402a and 402b.

Figure 5:
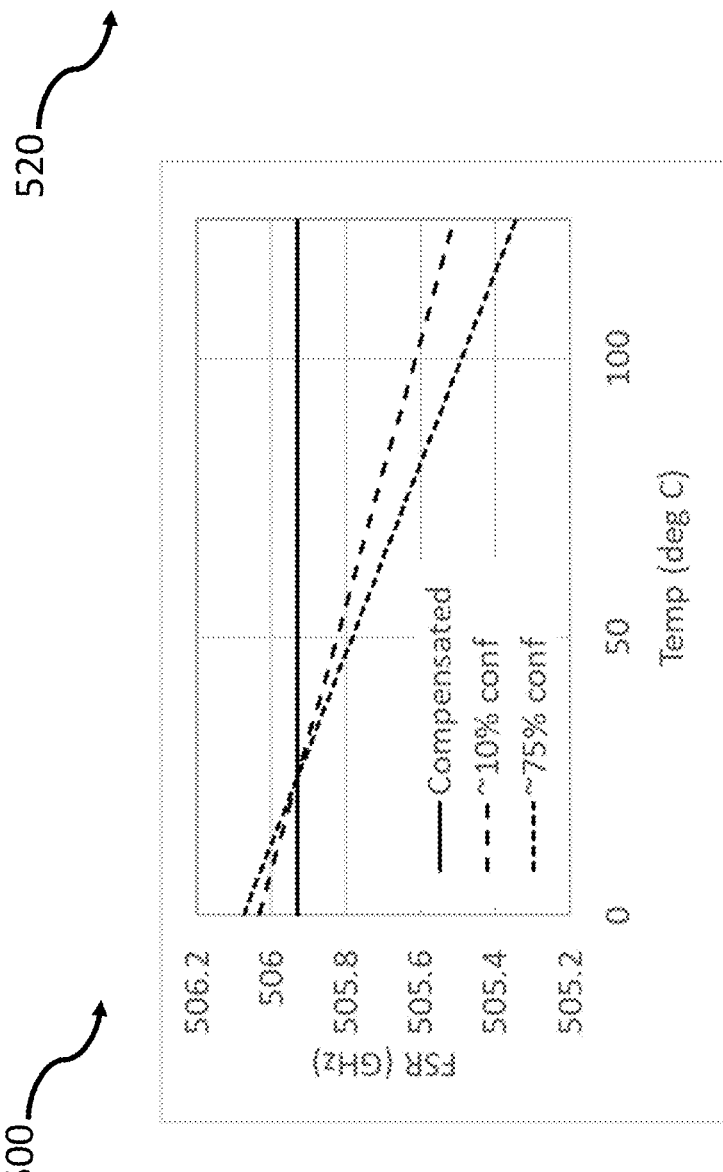
FIG. 5 shows illustrative numerical calculations for a device according to some embodiments of the present invention compared to prior art.

FIG. 5 in view 500 shows the results of illustrative calculations of the stability of the UMZI FSR as a function of temperature for three cases when the waveguide core is SiN, and the cladding is $SiO_2$. The "~10%" conf case corresponds to a UMZI in which a single waveguide geometry with 10% confinement in SiN is used, the "~75% conf" corresponds to a UMZI in which a single waveguide geometry with 75% confinement in SiN is used. Each of these cases corresponds to prior art UMZIs as shown in FIG. 1 The "Compensated" case corresponds to a UMZI in which both waveguide geometries (with ~10% and ~75% confinement in SiN) are used in each arm of the interferometer, as shown in FIGS. 2 and 3. The transition region is ignored in this calculation, as both arms would have the same transition region designs, so the presence of transition regions does not impact the results.

View 520 shows numerical details for an exemplary case, where $n_1$ and $n_2$, and $dn_1/dT$ and $dn_2/dT$ correspond to refractive index at a temperature of 25° C., and thermal sensitivity of the refractive index, for passive waveguides of two particular material compositions and geometries that provide 10% confinement, and 75% confinement respectively.

The first two sets of numbers, under the headings "~10% confinement" and "~75% confinement", show how the same target value of OPLD, which in turn determines FSR, can be achieved with either just a low confinement waveguide in each arm and one value of dL, the physical path length imbalance between the two arms of the interferometer, or with a high confinement waveguide in each arm and a different value of dL.

The third set of numbers, under the heading "Compensated" shows that the same target value of OPLD can be achieved using a combination of low confinement and high confinement waveguides in each arm, with an appropriate choice of lengths of the two waveguides of different confinements. In this particular example, one arm, arm 1, would have a length $L_{1=100}$ μm of the low confinement waveguide, and a length $L_{2=910}$ μm of the high confinement waveguide, while the other arm, arm 2, would have 1500 μm of low confinement and just over 100 μm of high confinement waveguide, and the resulting OPLD would exactly match that of the single waveguide design cases. Moreover, it can be shown that it is possible to select $L_{1a}$, $L_{1b}$, $L_{2a}$ and $L_{2b}$ for a given pair of dn/dT values to provide the same OPLD as that which would characterize a UMZI made up of either waveguide geometry not just at one particular temperature value but through the entire range of temperatures for which the values of dN/dT are constant, i.e. where the changes in index with temperature may be taken to be linear. In other words, in an ideal case, the thermal sensitivity of the FSR (and of the corresponding phase response of the UMZI) can be fully compensated using proper selection of the physical lengths of the segments of the two waveguide geometries present in the arms of the interferometer.

Qualitatively, this may readily be understood as follows. In any UMZI, one arm of the interferometer is deliberately longer than the other. So, if the change with temperature of the effective index of the waveguide is the same in both arms, the temperature dependent optical phase change accumulated through travelling though the longer arm will always be greater than that accumulated through the shorter arm. However, if the change with temperature of the effective index of the waveguide is somehow made to be lower in the longer arm than in the shorter arm, the effect of temperature changes on the difference in accumulated optical phase through the two arms can be minimized. The present invention achieves this temperature compensation by having a relatively large fraction of the longer arm of the UMZI made up of a waveguide design with low dn/dT (so the effective dn/dT of the whole arm is low) while the shorter arm of the UMZI has a relatively large fraction made up of a waveguide design with higher dn/dT. It is possible to achieve temperature independent FSR interferometers over large temperature ranges in this way, using waveguides characterized by two different geometries and two different dn/dT values.

Figure 6:
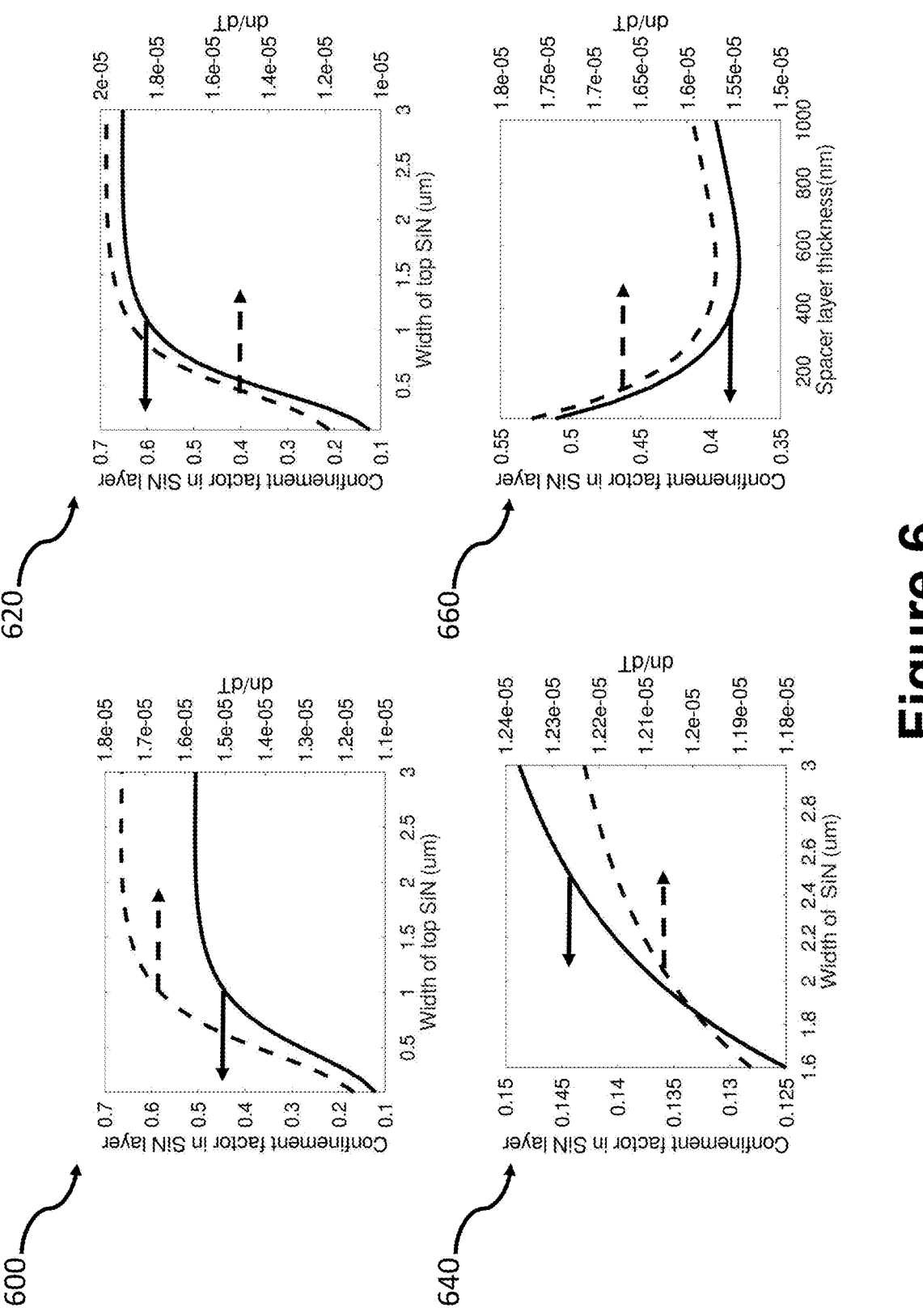
FIG. 6 shows illustrative simulation results for waveguide geometries according to some embodiments of the present invention.

FIG. 6 shows illustrative simulation results for waveguide geometries according to some embodiments of the present invention. In all views, the full line corresponds to the calculated confinement factor in the SiN layer (the core(s)), while the dashed line corresponds to the calculated dn/dT factor. The dn/dT factor applies to the mode that has the corresponding calculated confinement factor in the SiN cores(s), with the rest of the mode being in the $SiO_2$ material layer (the cladding). The calculations have been carried out for a free space wavelength of operation of 1550 nm, but all the results can be easily scaled to any other wavelength, materials and waveguide geometries.

View 600 corresponds to one illustrative embodiment of a dual-core waveguide structure as sketched in view 300, with two core sublayers 302a and 302b. In this illustrative case, the bottom sublayer 302b has a thickness of 100 nm and a fixed waveguide core width of 1700 nm, while only the thickness of top sublayer 302a is fixed, at 200 nm. The curves show the effect of changing the waveguide core width of top layer 302a on confinement in SiN and on dn/dT With a geometrical adjustment of core width from 100 nm to 3000 nm we can change the confinement in the SiN cores through a relatively wide range from ~0.1 (~10%) to almost ~0.5 (~50%), and can correspondingly change dn/dT from ~1.1e-5 to ~1.75e-5.

View 620 corresponds to another illustrative embodiment of a dual-core waveguide structure as sketched in view 300, with two core sublayers 302a and 302b. In this illustrative case, the bottom sublayer has a thickness of 100 nm and a fixed width of 1700 nm, while only the thickness of the top sublayer is fixed, but in this case at 300 nm. The curves show the effect of changing the waveguide core width of top layer 302a on confinement in SiN and on dn/dT. With a geometrical adjustment of core width from 100 nm to 3000 nm, we can change the confinement in the SiN cores through a relatively wide range from ~0.12 (12%) to almost ~0.65 (~65%), and can correspondingly change dn/dT from ~1.2e-5 to ~2e-5.

View 640 corresponds to an illustrative embodiment of a single-core waveguide structure as sketched in view 320 with a single core sublayer 322b. In this illustrative case, the single core sublayer has a thickness of 100 nm and the curves show the effect of changing the waveguide core width of that single SiN layer 322b on confinement in the SiN core and on dn/dT. With a geometrical adjustment of core width from 1600 nm to 3000 nm we can change the confinement in the SiN core through a narrow range from ~0.125 (12.5%) to ~0.15 (~15%) and can correspondingly change dn/dT from ~1.19e-5 to ~1.22e-5.

View 660 corresponds to another illustrative embodiment of a dual-core waveguide structure as sketched in view 300, with two core sublayers 302a and 302b. In this illustrative case, the bottom sublayer has a thickness of 100 nm and a fixed width of 1700 nm, while the top sublayer has a thickness of 300 nm and a fixed width of 750 nm, while the thickness of spacer 309 is swept from 50 nm to 1000 nm. The curves show the effect of changing the spacer thickness on confinement in SiN and on dn/dT. With a geometrical adjustment of the spacer from 50 nm to 1000 nm (for these particular SiN core dimensions), we can change the confinement in the SiN cores through a relatively wide range from ~0.51 (51%) to ~0.38 (~38%) and can correspondingly change dn/dT from ~1.75e-5 to ~1.58e-5.

Note that higher confinement in SiN can be attained by increasing the thickness of SiN layers and/or increasing the width of the waveguides.

Simulations illustrate that waveguides with a single core sublayer are characterized by a lower confinement in the core, while those with dual sublayer cores can provide much higher confinement in the cores. This means that a significant difference in dn/dT can be achieved between the two geometries. This can be used to improve thermal stability as explained above with the help of FIGS. 2-5.

Figure 7:
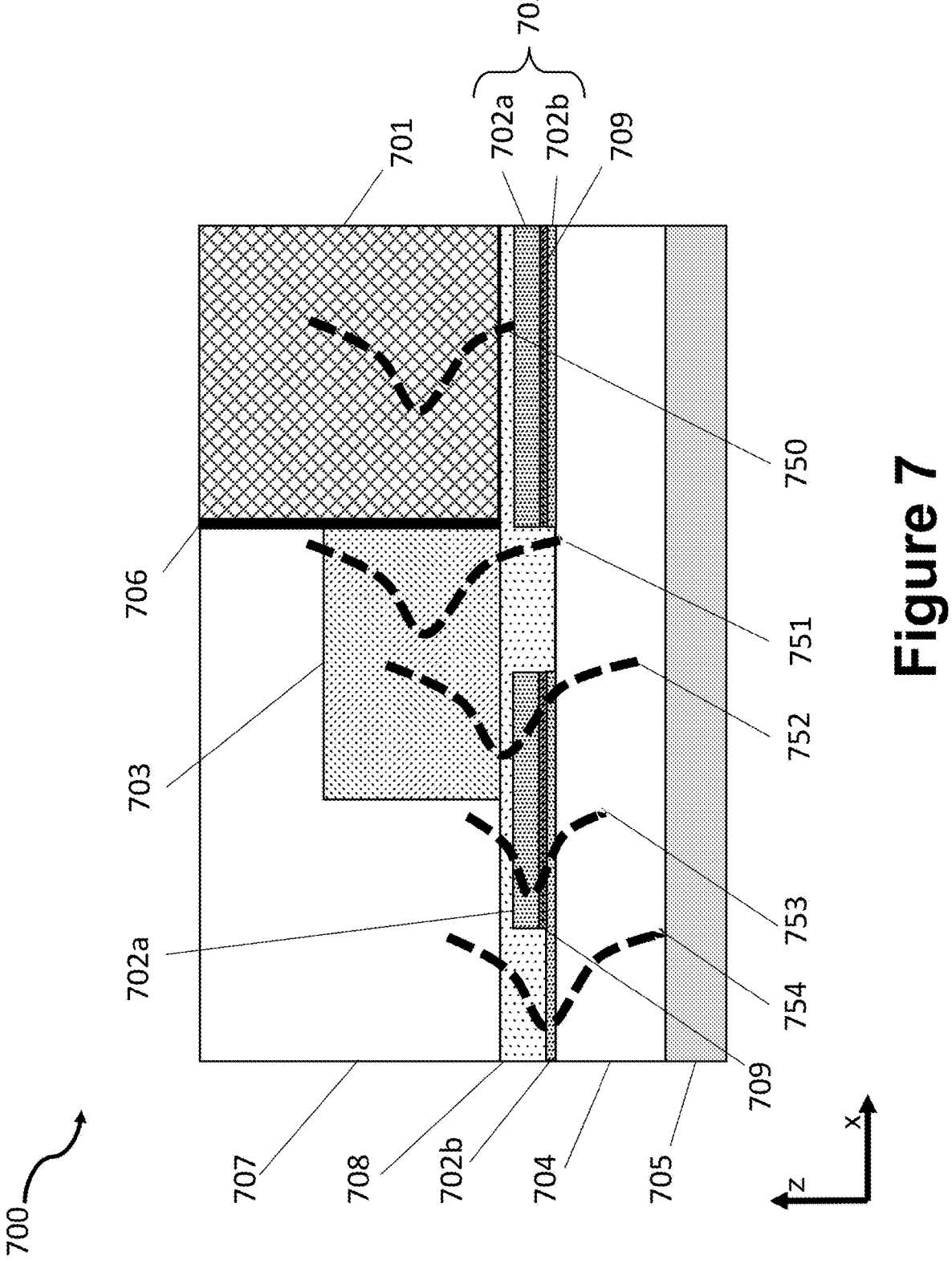
FIG. 7 shows a cross-sectional view of a device according to some embodiments of the present invention.

FIG. 7 is a schematic cross-section view of an integrated photonic device 700 utilizing butt-coupling and mode conversion for efficient coupling between dissimilar materials.

The illustrative cross-section includes a substrate 705. The substrate 705 can be any suitable substrate for semiconductor and dielectric processing, such as Si, InP, GaAs, quartz, sapphire, glass, GaN, silicon-on-insulator or other materials known in the art. In the shown embodiment, a layer of a second material 704 is deposited, grown, transferred, bonded or otherwise attached to the top surface of substrate 705 using techniques known in the field. The main purpose of layer 704 is to provide optical cladding for material 702 (described in more detail below), if necessary to form an optical waveguide. In some embodiments, layer 704 is omitted and substrate 705 itself serves as a cladding.

Layer 702 is deposited, grown, transferred, bonded, or otherwise attached to the top of layer 704 if present, and/or to the top of substrate 705 if layer 704 is not present, using techniques known in the field. Layer 702 comprises two sub-layers 702a and 702b that are separated by a spacer layer made from layer 709. The refractive index of layer 702 is higher than the refractive index of layer 704 if present, or, if layer 704 is not present, the refractive index of layer 702 is higher than the refractive index of substrate 705. Layers 704 and/or 702 can be patterned, etched, or redeposited to tailor their functionality (to define waveguides, splitters, couplers, gratings and other passive components) as is common in the art. In one embodiment, the material of layer 702 may include, but is not limited to, one or more of SiN, SiON, $TiO_2$, $Ta_2O_5$, (doped) $SiO_2$, $LiNbO_3$ and AlN. In some embodiments, other common dielectric materials may be used for layer 702.

Layer 709, whose refractive index is lower than the refractive index of layer 702, serves as a spacer layer between 702a and 702b. The thickness of the spacer (the thickness of layer 709 between sublayers 702a and 702b) is an optimization parameter, and in some embodiments is between 5 nm and 250 nm. In other embodiments, it is between 250 nm and 1000 nm. In yet other embodiments, it is thicker than 1 μm. The spacer thickness can be precisely controlled during the deposition. In some embodiments, layer 709 comprises one of $SiO_2$, SiON, and $Al_2O_3$.

Layer 708 can be deposited in an additional step, after layer 702 is patterned, and in some embodiments (and also as sketched in FIG. 7), it can additionally serve to planarize the patterned surface of layer 702. In some embodiments, the planarity of the top surface of combined layers 702 and 708 is provided by chemical mechanical polishing (CMP) or other etching, chemical and/or mechanical polishing methods. In other embodiments, the planarity is provided because of the intrinsic nature of the method by which layer 708 is deposited, for example if the material of layer 708 is a spin-on glass, polymer, photoresist or other suitable material. In some embodiments, both approaches are combined. The planarization may be controlled to leave a layer of desired, typically very small, thickness of layer 708 on top of the layer 702 (as shown in FIG. 7), or to remove all material above the level of the top surface of the layer 702 (not shown). In the cases where layer 708 is left on top of layer 702, the target thicknesses (on top of layer 702) are in the range of few nm to several hundreds of nm, with actual thickness, due to planarization process non-uniformities, being between zero and several hundreds of nanometers larger than the target thickness. In yet other embodiments, the thickness can be larger than a few hundreds of nanometers, and as large as 1 μm or more. In some embodiments, spin-on material is deposited and then etched back resulting in improved planarization uniformity across the wafer compared to typical CMP processes. In yet another embodiment (not shown), there is no planarization layer 708 filling in the etched regions of layer 702. In this embodiment there would be depressions or pockets where layer 702 was etched.

Layer 701 is bonded on top of the top surface of layer 708, or on top of the top surface of combined layer 702 and layer 708 if layer 708 is completely removed on top of layer 702. In yet other embodiments, layer 701 is bonded on top of layer 702 if layer 708 is not used to planarize the patterned top surface of layer 702. Layer 701 makes up what is commonly called an active device and comprises sublayers used to provide necessary optical and electrical confinement as is known in the art. Optical confinement, providing guiding of mode 750, might also utilize one or more etches to define mesa structure and confinement in the y-direction (perpendicular to the plane of FIG. 7). Layer 701 can provide optical gain (to make optical sources such as lasers, super-luminescent diodes and/or amplifiers), can provide modulation capabilities (to change intensity and/or phase of the light), and can provide photodetector functionality (to convert optical signals into electrical signals).

Efficient coupling between optical mode 750 supported in active structure 701 and optical modes 753 and 754, supported in the passive structures for which layer 702 provides the core, is facilitated by layer 703, and, in cases where layer 706 is present, by layer 706. Optional layer 706 primarily serves as either an anti-reflective or a highly-reflective coating at the interface between layer 701 and layer 703. Layer 703 serves as an intermediate waveguide that in some embodiments accepts the profile (depicted by line 750) of an optical mode supported by the waveguide for which layer 701 provides the core, captures it efficiently as mode profile 751, and gradually transfers it to mode profiles 752, and finally to mode profile 753. Mode profile 753 is efficiently coupled from the intermediate waveguide to the waveguide for which layer 702, with its two sublayers 702a and 702b, provides the core as described with the help of view 300 in FIG. 3.

The transition between mode profile 753 and mode profile 754 utilizes a transition region as described with the help of FIG. 4, where mode profile 754 utilizes sublayer 702b to provide the core of the waveguide, as described with the help of view 320 in FIG. 3.

The use of intermediate layer 703 significantly improves efficient transfer between high refractive index materials of layer 701 providing active functionality (such as e.g. GaAs, InP, GaN and their ternaries and quaternaries) to low refractive index materials providing core functionality of the passive waveguide (such as e.g. SiN, SiON, $TiO_2$, $Ta_2O_5$, $Al_2O_3$, and AlN).

Differences between the optical modes supported by waveguides in layers 701 and 702 respectively may or may not be obvious by observation of the mode profiles, but mode shape overlaps less than 100% along with non-zero vertical offsets (z-direction in in FIG. 7) between modes 750 and 753 could (in the absence of intermediate layer 703) result in significant optical loss. In some cases, losses of up to 2 dB may be considered acceptable, but losses greater than that might not be. In other cases, a 5 dB loss level may be the criterion chosen for acceptability. The function of layer 703 is to keep optical coupling losses due to imperfect mode overlap and vertical offset (between modes 750 and 753) below whatever is determined to be an acceptable level in a given application.

In embodiments, where layer 708 is not present, layer 703 is positioned directly on top of patterned layer 702 by one of various well known deposition methods. In such embodiments, there is no planarization step.

It is to be understood that these illustrative embodiments teach just some examples of thermally stabilized unbalanced interferometers and heterogeneously integrated lasers and active components utilizing the present invention, and many other, similar arrangements can be envisioned. As an example, unbalanced Mach-Zehnder architecture of the interferometer can be replaced with Michelson interferometer architecture or some other suitable architecture that can be thermally stabilized utilizing two waveguide geometries. Furthermore, such lasers and active components can be combined with multiple other components to provide additional functionality or better performance such as various filtering elements, amplifiers, monitor photodiodes, modulators and/or other photonic components.

Embodiments of the present invention offer many benefits. The integration platform enables scalable manufacturing of PICs made from multiple materials providing better thermal stability and higher-performance and/or ability to operate in broader wavelength ranges. Furthermore, the platform is capable of handling high optical power compared to typical Si waveguide-based or InP waveguide-based PICS.

In embodiments where SiN, SiON, $TiO_2$, $Ta_2O_5$, $Al_2O_3$, or AlN are used as waveguide core material, their lower refractive index and correspondingly lower refractive index contrast with respect to that of the cladding ($SiO_2$ or other suitable low refractive index material) helps to reduce the sensitivity of the optimized athermal UMZI to fabrication imperfections when compared with some other PIC platforms where waveguides are realized in materials such as Si, GaAs, InP, etc that are characterized by higher refractive index.

This present invention utilizes a process flow consisting typically of wafer-bonding of a piece of compound semiconductor material on a carrier wafer with dielectric waveguides (as is described with the help of FIG. 7) and subsequent semiconductor fabrication processes as is known in the art. It enables an accurate definition of optical alignment between active and passive waveguides typically via a lithography step, removing the need for precise physical alignment. Said lithography-based alignment allows for scalable manufacturing using wafer scale techniques.

It is to be understood that optical coupling between modes in active and passive layers is reciprocal, so that, taking FIG. 7 as an example, the structure can be configured to facilitate light transmission from region 701 to region 702, but it could also facilitate transmission in the reverse direction, from region 702 to region 701. It is to be understood that multiple such transitions with no limitation in their number or orientation can be realized on a suitably configured PIC.

Other approaches have relied on die attachment of prefabricated optical active devices to passive waveguides. This requires very stringent alignment accuracy which is typically beyond what a typical die-bonder can provide. This aspect limits the throughput of this process as well as the performance of optical coupling.

Embodiments of the optical devices described herein may be incorporated into various other devices and systems including, but not limited to, various computing and/or consumer electronic devices/appliances, communication systems, medical devices, sensors, and sensing systems.

It is to be understood that the disclosure teaches just few examples of the illustrative) embodiment and that many variations of the invention can easily be devised by those skilled in the art after reading this disclosure and that the scope of the present invention is to be determined by the following claims.

The invention claimed is:

1. A device comprising:

a dual-geometry waveguide structure comprising two coupler structures that are optically coupled using first and second arms characterized by total optical path lengths $L_U$ and $L_L$ respectively, providing an optical path length difference value $L_O = L_U - L_L$;

wherein the first arm comprises:

a first passive waveguide, having a first length and a first waveguide geometry comprising a dual-core geometry of two cores separated by a spacer layer, and being characterized by a first temperature dependence of refractive index $dn_1/dT$;

a second passive waveguide, having a second length and a second waveguide geometry comprising a single-core geometry, and being characterized by a second temperature dependence of refractive index $dn_2/dT$ lower than $dn1/dT$; and a first tapered transition structure of length $L_t$ directly coupling the first and second passive waveguides;

wherein the second arm comprises:

a third passive waveguide having a third length and the first waveguide geometry, and being characterized by $dn_1/dT$;

a fourth passive waveguide having a fourth length and the second waveguide geometry, and being characterized by $dn_2/dT$; and a second tapered transition structure of length $L_T$ directly coupling the third and fourth passive waveguides;

wherein a first confinement factor characterizing an optical mode supported by the first and third passive waveguides is larger than a second confinement factor of an optical mode supported by the second and fourth passive waveguides; and wherein the first, second, third, and fourth lengths are selected such that a temperature sensitivity characterizing the dual-geometry waveguide structure is lower than a temperature sensitivity characterizing a single-geometry waveguide structure having the same optical path length difference value $L_O$ between first and second arms would be, in which all passive waveguides in either the first arm or the second arm are of a single-core geometry or of a dual core geometry, but not both.

2. The device of claim 1, wherein the cores of the first passive waveguide and the core of the second passive waveguide comprise at least one of SiN, SiON, TiO2, Ta2O5, Al2O3, and AlN.

3. The device of claim 2, wherein the spacer layer comprises at least one of SiO2, Al2O3 and SiON.

4. The device of claim 3, wherein top and bottom surfaces of the spacer layer of the dual-core geometry are parallel to a top plane of a substrate of the dual waveguide, the top surface underlying a first core of the two cores and the bottom surface overlying a second core of the two cores, wherein the spacer layer has a spacer thickness, perpendicular to the top and bottom surfaces, between 5 nm and 250 nm.

5. The device of claim 3, wherein top and bottom surfaces of the spacer layer of the dual-core geometry are parallel to a top plane of a substrate of the dual waveguide, the top surface underlying a first core of the two cores and the bottom surface overlying a second core of the two cores, wherein the spacer layer has a spacer thickness, perpendicular to the top and bottom surfaces, between 250 nm and 1000 nm.

6. The device of claim 3, wherein the core of the second passive waveguide has a single core thickness between 50 nm and 200 nm.

7. The device of claim 3, wherein each of the two cores of the first passive waveguide has a thickness between 50 nm and 650 nm.

8. The device of claim 1, wherein a first one of the two couplers receives an optical input to the dual-geometry waveguide structure;

wherein a second one of the two couplers provides an output from the dual-geometry waveguide structure; and wherein the output of the dual-geometry waveguide structure is coupled to a photodetector comprising at least one of Ga, As, In and P.

9. The device of claim 8, wherein the photodetector supports a first optical mode differing from a second optical mode characterizing the output from the dual-geometry waveguide structure;

wherein the coupling between the photodetector and the dual-geometry waveguide structure comprises an intermediate structure supporting an intermediate optical mode;

wherein the intermediate structure is butt-coupled to the photodetector;

wherein a tapered waveguide structure in at least one of the dual-geometry waveguide structure and the intermediate structure facilitates efficient adiabatic transformation between the second optical mode and the intermediate optical mode; and wherein no adiabatic transformation occurs between the intermediate optical mode and the first optical mode.

10. The device of claim 9, wherein the coupler structures, arm structures, intermediate structure and photodetector are integrated on a common substrate.

* * * * *